US012626690B2

(12) United States Patent
Smyth et al.

(10) Patent No.: US 12,626,690 B2
(45) Date of Patent: May 12, 2026

(54) SYSTEMS, METHODS, AND DEVICES FOR LOW-POWER AUDIO SIGNAL DETECTION

(71) Applicant: Cypress Semiconductor Corporation, San Jose, CA (US)

(72) Inventors: Aidan Smyth, Irvine, CA (US); Ashutosh Pandey, Irvine, CA (US); Niall Lyons, Irvine, CA (US); Ted Wada, Irvine, CA (US); Robert Zopf, Rancho Santa Margarita, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 214 days.

(21) Appl. No.: 18/449,237

(22) Filed: Aug. 14, 2023

(65) Prior Publication Data

US 2024/0062745 A1 Feb. 22, 2024

Related U.S. Application Data

(60) Provisional application No. 63/398,370, filed on Aug. 16, 2022.

(51) Int. Cl.
| | |
|---|---|
| *G10L 15/06* | (2013.01) |
| *G10L 15/01* | (2013.01) |
| *G10L 15/02* | (2006.01) |
| *G10L 15/187* | (2013.01) |
| *G10L 15/08* | (2006.01) |

(52) U.S. Cl.
CPC ............ *G10L 15/063* (2013.01); *G10L 15/01* (2013.01); *G10L 15/02* (2013.01); *G10L 15/187* (2013.01); *G10L 2015/025* (2013.01); *G10L 2015/0635* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 11,227,122 B1 * | 1/2022 | Gill | .......................... | G06N 5/04 |
| 11,355,102 B1 * | 6/2022 | Mishchenko | ......... | G10L 15/063 |

(Continued)

OTHER PUBLICATIONS

Gao, Yixin, et al. "Towards data-efficient modeling for wake word spotting." ICASSP 2020-2020 IEEE International Conference on Acoustics, Speech and Signal Processing (ICASSP). IEEE, 2020. (Year: 2020).*

(Continued)

*Primary Examiner* — Douglas Godbold

(57) ABSTRACT

Systems, methods, and devices detect wake signals included in audio signals. Methods include receiving a dataset including raw audio data, the raw audio data comprising a plurality of audio samples and associated metadata, and generating, using one or more processing elements, an augmented dataset based on the raw audio data, the augmented dataset comprising a plurality of annotations identifying types of raw audio data. Methods further include generating, using the one or more processing elements, a feature dataset by extracting features from the augmented dataset based, at least in part, on the plurality of annotations, and generating, using the one or more processing elements, a wake signal detection model based, at least in part, on the feature dataset, the wake signal detection model being a machine learning model trained based on the feature dataset.

20 Claims, 8 Drawing Sheets

(56) References Cited

U.S. PATENT DOCUMENTS

| 11,551,670 B1 * | 1/2023 | Smith | .................... | G10L 15/063 |
| 12,112,752 B1 * | 10/2024 | Gupta | ..................... | G10L 15/08 |
| 2017/0270919 A1 | 9/2017 | Parthasarathi et al. | | |
| 2020/0279561 A1 | 9/2020 | Sheeder et al. | | |
| 2020/0349925 A1 * | 11/2020 | Shahid | .................... | G10L 15/08 |
| 2020/0365138 A1 * | 11/2020 | Kim | ........................ | G06F 3/167 |
| 2021/0050003 A1 * | 2/2021 | Zaheer | .................... | G10L 15/16 |
| 2021/0174794 A1 * | 6/2021 | Mont-Reynaud | ....... | G06F 3/167 |
| 2021/0249035 A1 | 8/2021 | Bone et al. | | |
| 2021/0350798 A1 * | 11/2021 | Zopf | .................... | G10L 15/183 |
| 2021/0385319 A1 | 12/2021 | Holleman, III | | |
| 2022/0068272 A1 | 3/2022 | Kwatra et al. | | |

OTHER PUBLICATIONS

USPTO Search Report and Written Opinion from Application PCT/US23/30277 dated Nov. 9, 2023 14 pages.

* cited by examiner

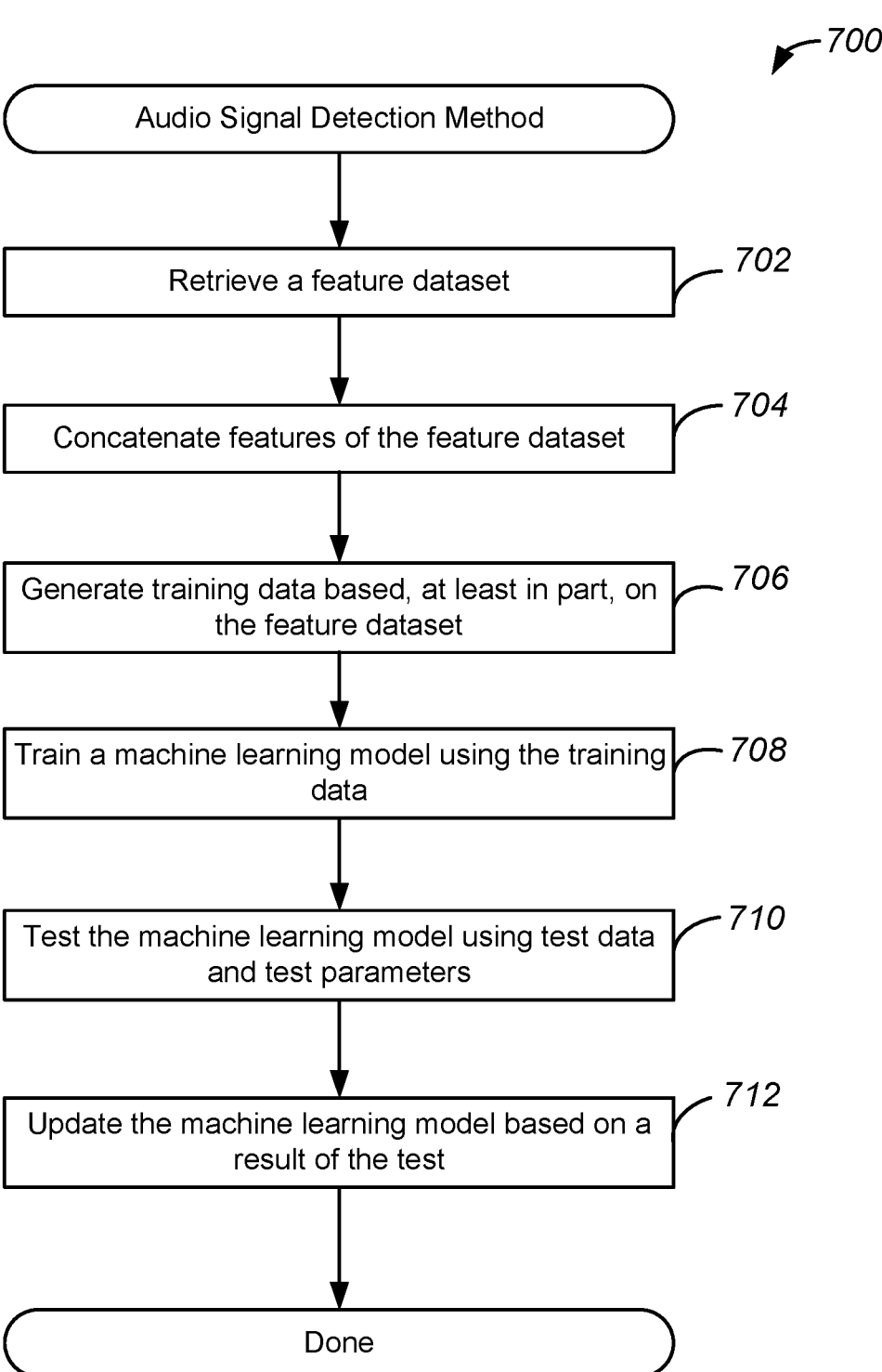

*700*

Audio Signal Detection Method

Retrieve a feature dataset — *702*

Concatenate features of the feature dataset — *704*

Generate training data based, at least in part, on the feature dataset — *706*

Train a machine learning model using the training data — *708*

Test the machine learning model using test data and test parameters — *710*

Update the machine learning model based on a result of the test — *712*

Done

*FIG. 7*

SYSTEMS, METHODS, AND DEVICES FOR LOW-POWER AUDIO SIGNAL DETECTION

TECHNICAL FIELD

This disclosure relates to low-power devices, and more specifically, to enhancement of audio signal detection performed by such low-power devices.

BACKGROUND

Audio and voice control capabilities may be applied in systems and devices in a variety of contexts, such as smart devices and smart appliances. Such smart devices may include smart assistants, also referred to as virtual assistants, that are configured to respond to voice commands. For example, a user may provide a specific word and/or phrase that may trigger activation of the smart device. Such a phrase may include one or more specific wake words that wake the smart device, and may cause the smart to device to perform one or more operations. Conventional techniques for processing such wake words remain limited because they are limited in their ability to identify such wake words in a power efficient and accurate manner.

BRIEF DESCRIPTION OF THE DRAWINGS

FIG. 7 illustrates an example of a method for low-power audio signal detection, performed in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Systems and devices may be configured to implement voice control functionalities for a variety of purposes, such as for smart devices and smart appliances. For example, smart devices may include smart assistants, also referred to as virtual assistants, that are configured to respond to voice commands. For example, a smart device may be in a dormant state and may be in a sleep mode. In response to detecting a particular auditory input, such as an audio signal which may be include particular word and/or phrase, the smart device may wake and listen for a command or a query. Conventional techniques for identifying such voice inputs and commands are limited because they utilize components having high power consumption characteristics, or may have relatively low accuracy when implemented in a low-power context.

Embodiments disclosed herein provide audio signal detection techniques having increased accuracy in low-power operational contexts. As will be discussed in greater detail below, embodiments disclosed herein perform data augmentation, feature extraction, and annotation to generate training data used to configure a machine learning model, and a low-power version of the machine learning model is then implemented in a an audio signal processing device that may be a low-power device. Accordingly, the model may be trained to increase the accuracy of the low-power device used for audio signal detection, and also increase an overall power efficiency by reducing inadvertent and erroneous wake transitions.

Figure 1:
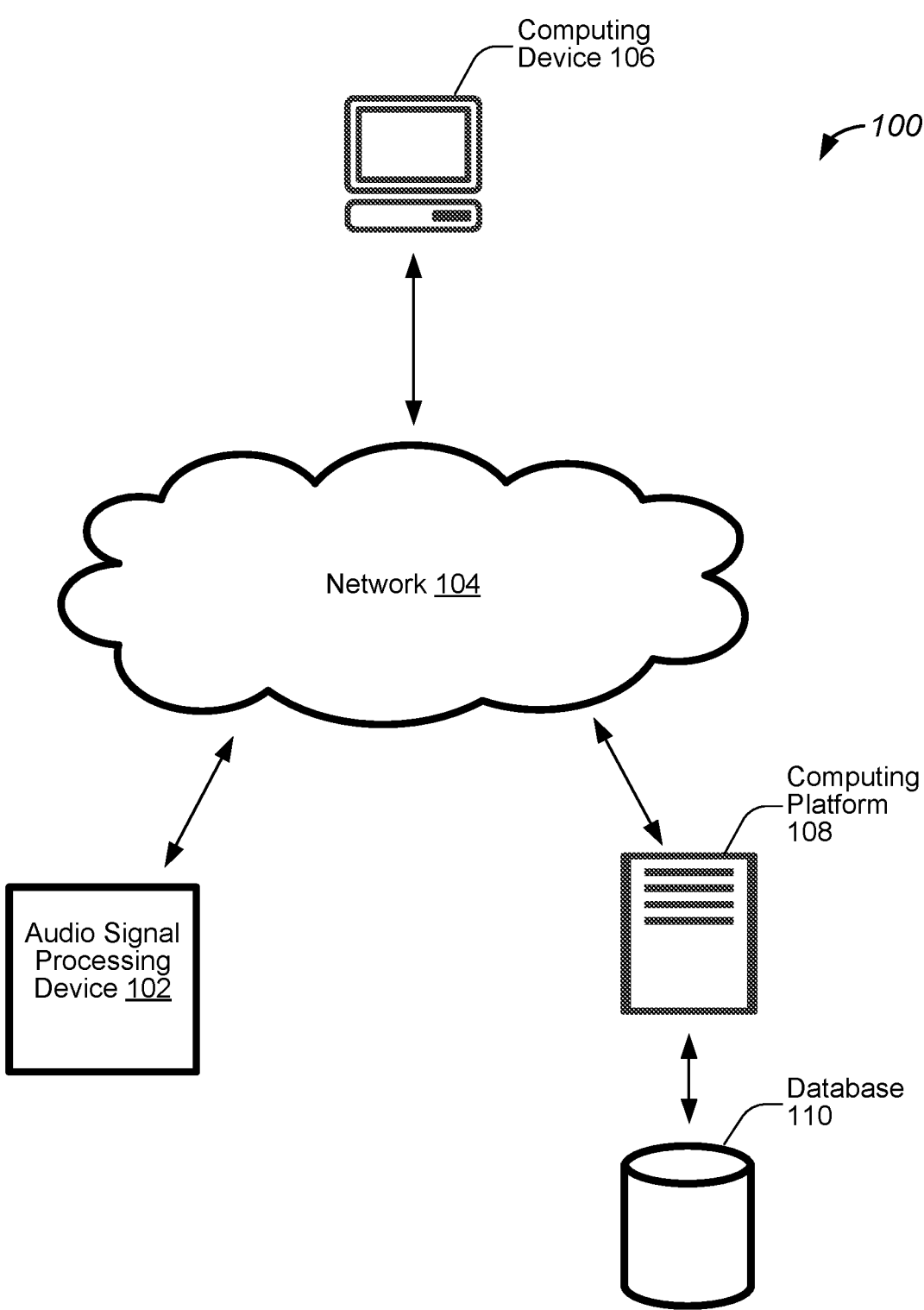
FIG. 1 illustrates an example of a system for low-power audio signal detection, configured in accordance with some embodiments.

FIG. 1 illustrates an example of a system for low-power audio signal detection, configured in accordance with some embodiments. Accordingly, a system, such as system 100, may include various devices which may communicate with each other via a network, such as network 104. Moreover, one or more of the devices may be include a low-power circuit configured to identify a wake word or phrase. As will be discussed in greater detail below, embodiments disclosed herein are configured to increase the efficiency and accuracy of such devices when identifying such wake words and phrases.

Accordingly, system 100 includes an audio signal processing device, such as audio signal processing device 102, which is configured to receive and analyze audio input to identify the presence of a particular audio signal, which may be a wake word or phrase. In one example, audio signal processing device 102 is a smart home device configured to support one or more smart home applications and/or services. Accordingly, audio signal processing device 102 may be configured to respond to an audio command from a user, where such an audio command wakes audio signal processing device 102 from a sleep or low power state, and causes audio signal processing device 102 to wait for an additional command. As will be discussed in greater detail below, audio signal processing device 102 is configured to continuously listen to ambient noise, and identify a particular wake word or phrase to transition from a sleep state to a wake state, and prepare for additional operations as may be appropriate for a smart home application that is being invoked. As will also be discussed in greater detail below, a machine learning model may be trained and implemented to increase the accuracy of audio signal identification, and reduce overall power consumption by reducing false positives and associated unnecessary transitions to a wake state.

System 100 further includes computing device 106 which may be a client machine operated by an entity, such as a user. In various embodiments, computing device 106 is configured to communicate with audio signal processing device 102 via network 104. More specifically, computing device 106 may include one or more processors and memory configured to interact with one or more applications on audio signal processing device 102, and may also be configured to program one or more components of audio signal processing device 102. In one example, a machine learning model may be executed on computing device 106, and may be used to program one or more components of audio signal processing device 102 based on the machine learning model. It will be appreciated that computing device 106 may be coupled to audio signal processing device 102 via a local network, or a network such as the internet.

System 100 further includes computing platform 108 which may be coupled to database 110. In various embodiments, computing platform 108 is configured to execute an application, which may be a distributed application, that may be hosted by an entity such as a third party service provider which may be an on-demand service provider. As similarly discussed above, computing platform 108 may include one or more processors and memory configured to interact with one or more applications on audio signal processing device 102, and may also be configured to program one or more components of audio signal processing device 102. For example, a machine learning model may be executed on computing platform 108, and may be used to program one or more components of audio signal processing device 102 based on the machine learning model. Accordingly, a machine learning model as disclosed herein may be executed on computing device 106, computing platform 108, or on audio signal processing device 102 itself.

Figure 2:
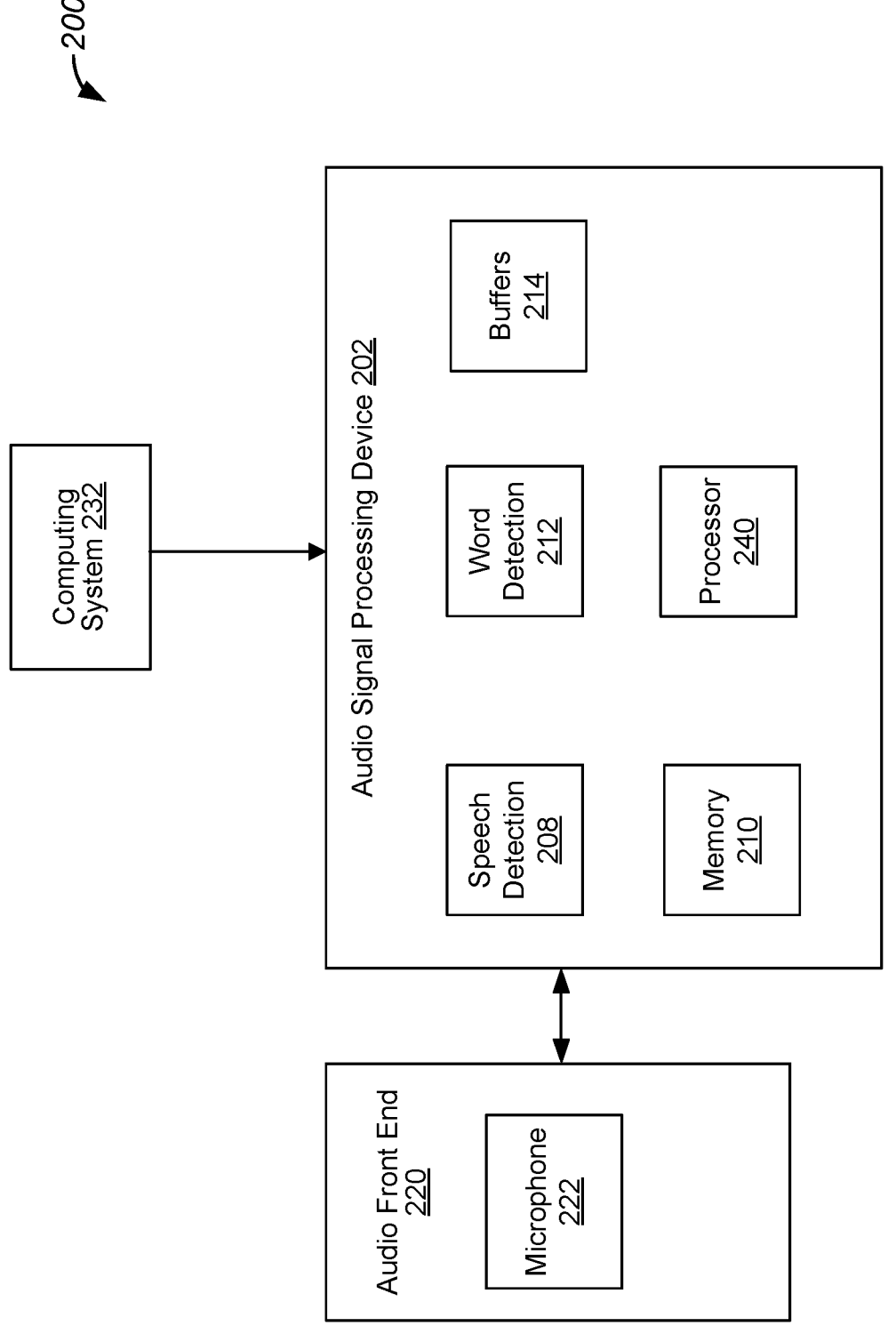
FIG. 2 illustrates an example of a device for low-power audio signal detection, configured in accordance with some embodiments.

FIG. 2 illustrates an example of a device for low-power audio signal detection, configured in accordance with some embodiments. As similarly discussed above, a system, such as system 200, may be configured to perform audio signal detection operations, as may be included in wake word and/or wake phrase detection used by various appliances and devices, such as smart home devices. For example, system 200 may include an audio front end as well as various components implemented in an audio signal processing device. In various embodiments, system 200 additionally includes a computing system that may facilitate the training and implementation of a machine learning model to improve the accuracy and efficiency of such wake word and/or wake phrase detection.

In various embodiments, system 200 includes audio front end 220 which may include various components configured to receive audio signals. For example, audio front end 220 may include one or more microphones, such as microphone 222. Audio front end 220 may also include analog components, such as amplifiers, as well as associated digital components, such as an analog-to-digital converter and a first-in-first-out (FIFO) register. In some embodiments, components of audio front end 220, such as microphones, may be configured to operate in low power consumption states until a designated threshold of acoustic activity is detected. In various embodiments, the analog components may also include one or more low-power analog comparators and digital counters for acoustic activity detection. Accordingly, audio front end 220 is configured to receive audio signals from an environment in which system 200 is implemented, and is further configured to convert such audio signals into a stream of digital data. As similarly discussed above, such audio signals may include voice or audio commands from a user. Accordingly, speech from a user may be detected via microphone 222 and audio front end 220 may be configured to monitor acoustic signals and dynamically compute and potentially adjust an activation threshold of an audio signal that triggers a speech detection module, as will be discussed in greater detail below.

In various embodiments, system 200 includes audio signal processing device 202 that may be implemented using one or more processing elements. Such processing elements may be included in low power circuitry implemented on a low power chipset. As similarly discussed above, audio signal processing device 202 may include one or more components configured to perform wake word and/or phrase detection operations that include operations such as detection of acoustic activity, detection of speech, and detection and identification of a wake word/phrase. For example, audio signal processing device 202 may include speech detection module 208 that is configured to detect the presence of speech within a received audio signal. Accordingly, speech detection module 208 is configured to distinguish between ambient sounds and a user's speech.

In various embodiments, speech onset detection is performed by tracking a noise floor through minimum statistics and/or monitoring short term energy evolution. Speech detection module 208 may include a peak energy detector may be configured to track an instantaneous energy against the noise floor to identify speech onset. It will be appreciated that speech detection module 208 may be configured to use any of the speech onset detection algorithms or techniques known to those of ordinary skill in the art. In some embodiments, upon detecting a speech onset event, speech detection module 208 asserts a status signal to word detection module 212.

In various embodiments, during detection operations, the stages are monitored through a state machine where detection progresses through designated states, and may also be implemented with a time-out operation if a designated amount of time elapses. In various embodiments, speech detection module 208 is implemented via software. Accordingly, speech detection module 208 may be implemented using one or more processors included in audio signal processing device 202, such as processor 240, as well as a memory, such as memory 210 discussed in greater detail below. In another example, speech detection module 208 may be implemented using a dedicated hardware accelerator included in audio signal processing device 202.

Audio signal processing device 202 may include word detection module 212 which is configured to perform word detection performed by system 200. Accordingly, word detection module 212 may be implemented using a dedicated hardware accelerator and may perform word detection operations based on a comparison of the received audio data to that of one or more stored wake words. Accordingly, word detection module 212 may compare received audio data to a stored designated audio pattern corresponding to a wake word/phrase, and may generate an output identifying a result of the comparison. In one example, word detection module 212 is configured to perform operations such as feature extraction on the received audio data, and to store extracted features in one of buffers 214. In various embodiments, such feature extraction transforms audio data from a time domain to a frequency domain, and patterns are identified in the resulting audio spectrum in the frequency domain. In some embodiments, operation of word detection module 212 is configured an additional component, such as computing system 232 discussed in greater detail below. More specifically, a low-power version of a machine learning model may be generated by computing system 232 and implemented in word detection module 212. Additional details regarding the generation of training data and the machine learning model are discussed in greater detail below. It will be appreciated that any suitable word detection techniques may also be used.

Audio signal processing device 202 may include buffers 214 that are configured to buffer received audio data. Accordingly, buffers 214 may be configured to buffer received audio data and provide such buffered audio data to word detection module 212 when word detection module 212 requests such data, as may occur when word detection module 212 is triggered by speech detection module 208. In some embodiments, a size of buffers 214 may be configured based on requirements of word detection module 212. Audio signal processing device 202 may also include memory 210 which may be a local memory device configured to store software as well as audio data received and processed by speech detection module 208 and word detection module 212. Accordingly, memory 210 may be configured to store software used to implement one or more modules described above when such modules are implemented as software.

System 200 further includes computing system 232 which is configured to include one or more processors and memory configured to implement a machine learning framework for wake word/phrase detection. Computing system 232 may also include a communications interface configured to communicate with a communications interface of audio signal processing device 202. As will be discussed in greater detail below, various datasets may undergo feature extraction and be filtered and sanitized, as well as annotated and augmented to generate novel datasets used as training data for a machine learning model. Accordingly, computing system 232 may be configured to receive such datasets and generate training data, as well as train the machine learning model to perform wake work/phrase detection. Computing system 232 may also be configured to generate a low-power version of the machine learning model that is configured to be implemented in audio signal processing device 202. Such a low-power version of the model may, for example, be a neural network that has fewer layers of neurons. In this way, computing system 232 may be configured to generate a machine learning model configured to improve accuracy of wake word/phrase detection, and may also be configured to generate a low-power version capable of being implemented in a low-power device, such as audio signal processing device 202. It will be appreciated that in some embodiments, audio signal processing device 202 is not a low-power device, and may perform machine learning model inference and training operations itself.

Figure 3:
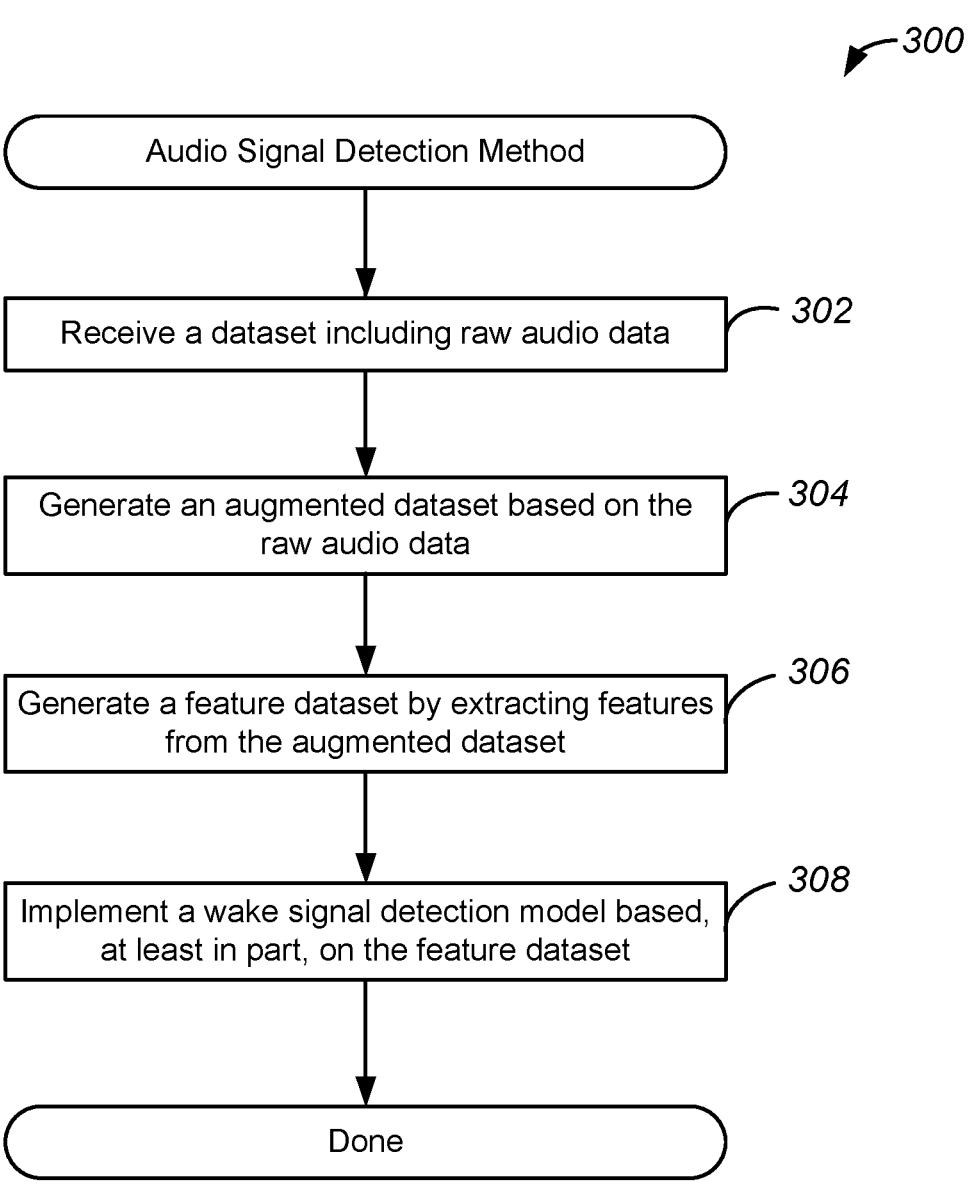
FIG. 3 illustrates an example of a method for low-power audio signal detection, performed in accordance with some embodiments.

FIG. 3 illustrates an example of a method for low-power audio signal detection, performed in accordance with some embodiments. As discussed above, a machine learning model may be generated to improve accuracy and efficiency of such audio signal detection. As will be discussed in greater detail below, a method, such as method 300, may be performed to generate training data used to configured and implement such a machine learning model. More specifically, a machine learning infrastructure provides the ability to precisely tune operation of the machine learning model by providing novel techniques for generation of training data used to train the machine learning model, thus improving its accuracy in audio signal detection operations, such as wake word/phrase detection.

Method 300 may perform operation 302 during which a dataset including audio data may be received. In various embodiments, the dataset may include raw audio data generated based on audio samples received from various different data sources. For example, the audio data may have been generated by previous audio signal detection operations of an audio signal processing device, or may be retrieved from one or more external data sources, such as an external database used to store and archive audio data. In some embodiments, the audio data may be retrieved from a third party entity, such as a third party vendor or an open source database.

Method 300 may perform operation 304 during which an augmented dataset may be generated based on the audio data. In various embodiments, the augmented dataset may be generated by annotating the dataset and filtering the dataset to improve a quality of the underlying data. As will be discussed in greater detail below, such dataset annotation may be used to classify audio data with a relatively high degree of accuracy. The dataset may also be augmented to increase a size and variability of the dataset. Accordingly, during operation 304, various data processing operations may be performed to enrich the raw data and generate associated annotations.

Method 300 may perform operation 306 during which a feature dataset may be generated by extracting features from the augmented dataset. Accordingly, features may be extracted from the augmented dataset using a feature extractor, as similarly discussed above. As will be discussed in greater detail below, the extracted features may also be serialized and filtered to generate a feature dataset.

Method 300 may perform operation 308 during which a wake signal detection model may be generated based, at least in part, on the feature dataset. As will be discussed in greater detail below, one or more feature datasets may be used to generate one or more sets of training data used to train a machine learning model. For example, multiple feature datasets may be concatenated to generate a set of training data. Moreover, iterating training of the machine learning model may be implemented such that operation of the machine learning model is tested and updated based on a result of the testing. The resulting machine learning model may be converted to a low-power machine learning model, and may be transmitted to an audio signal processing device where it is used for audio signal detection.

Figure 4:
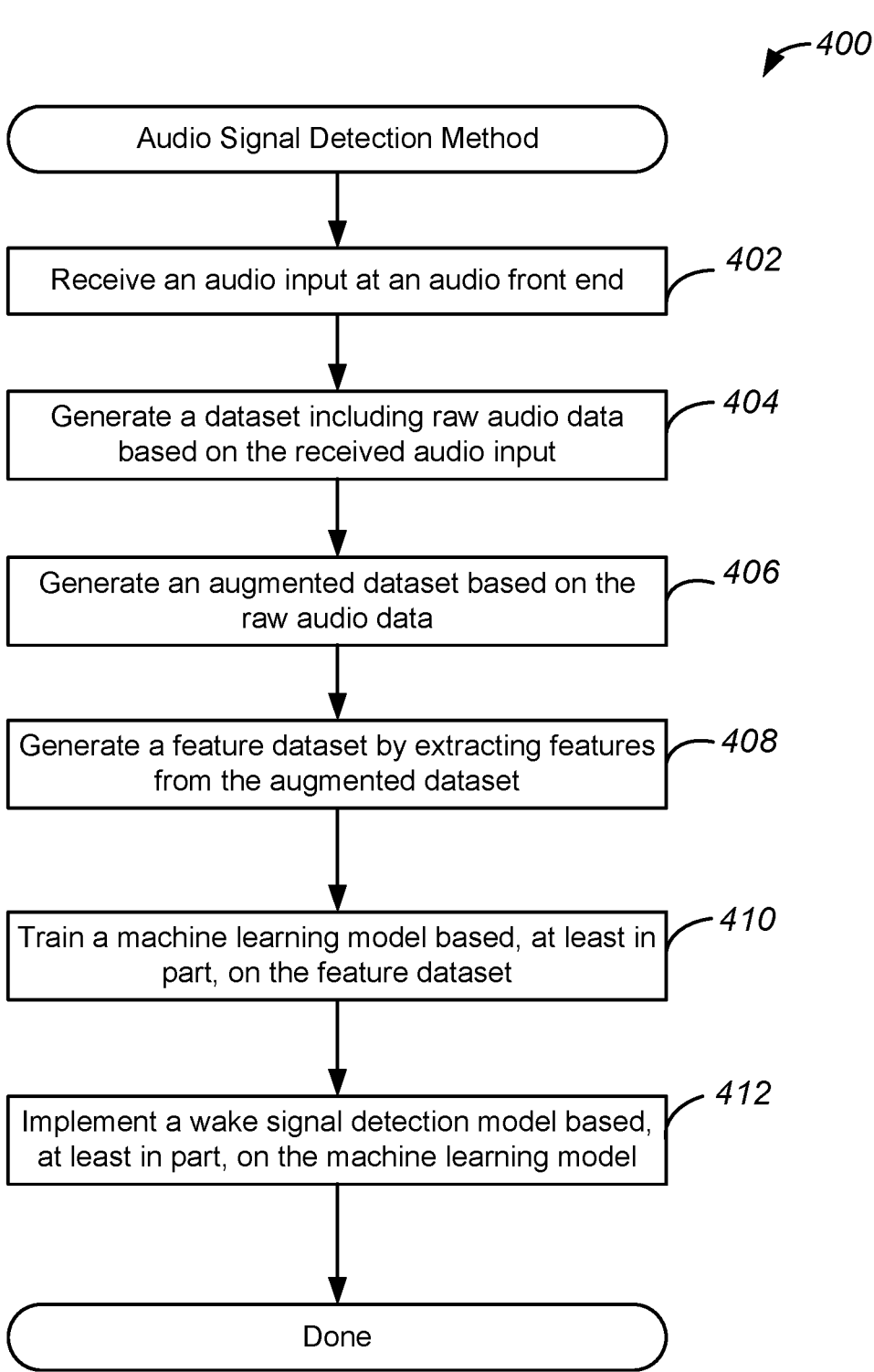
FIG. 4 illustrates an example of another method for low-power audio signal detection, performed in accordance with some embodiments.

FIG. 4 illustrates an example of another method for low-power audio signal detection, performed in accordance with some embodiments. As discussed above, a machine learning model may be generated to improve accuracy and efficiency of such audio signal detection. As will be discussed in greater detail below, a method, such as method 400, may be performed to configure and implement a machine learning model at an audio signal processing device. More specifically, a machine learning infrastructure provides the ability to precisely tune operation of the machine learning model by providing novel techniques for generation of training data used to train the machine learning model. Moreover, a version of such a machine learning model may be configured for an audio signal processing device, and may be used to improve accuracy of the audio signal processing device when performing audio signal detection operations, such as wake word/phrase detection.

Method 400 may perform operation 402 an audio input may be received. Accordingly, an audio input may be received at an audio front end of an audio signal processing device, or may be received at another processing device used to populate an audio sample database. As similarly discussed above, the audio input may be detected by one or more components of the audio front end, such as a microphone, and may be digitized and transmitted to one or more other system components.

Method 400 may perform operation 404 during which a dataset including the audio data may be generated. In various embodiments, the dataset may include raw audio data generated based on the received audio input. Moreover, the audio data may be stored in a data structure configured to store a waveform or spectrogram generated based on the audio input as well as associated metadata. As similarly discussed above, the audio data may be generated based on the audio input as well as audio samples received from various different data sources. In one example, the audio data may have been generated by previous audio signal detection operations of an audio signal processing device, or may be retrieved from one or more external data sources, such as an external database used to store and archive audio data. In some embodiments, the audio data may be retrieved from a third party entity, such as a third party vendor or an open source database.

Method 400 may perform operation 406 during which an augmented dataset may be generated based on the audio data. As similarly discussed above, the augmented dataset may be generated by annotating the dataset and filtering the dataset to improve a quality of the underlying data. Moreover, the dataset may also be augmented to increase a size and variability of the dataset, and to achieve a target distribution of data within the dataset. Additional details regarding the annotation and generation of the augmented dataset are discussed in greater detail below with reference to FIG. 5.

Method 400 may perform operation 408 during which a feature dataset may be generated by extracting features from the augmented dataset. Accordingly, features may be extracted from the augmented dataset using a feature extractor, as similarly discussed above. In some embodiments, such feature extraction may be performed using a feature extraction library configured to extract spectral features configured for running in a real-time system. Accordingly, such feature extraction may generate spectrogram-like features from the augmented dataset. Additional details regarding feature extraction are discussed in greater detail below with reference to FIG. 6.

Method 400 may perform operation 410 a machine learning model may be trained based, at least in part, on the feature dataset. This, according to some embodiments, the machine learning model may be a supervised machine learning model that is trained based on a training dataset. As will be discussed in greater detail below, such a training dataset may be generated base on one or more feature datasets. In one example, multiple feature datasets may be concatenated to generate the training dataset. Moreover, additional augmentation operations and testing/verification operations may be performed to further train the machine learning model. Additional details regarding the machine learning model are discussed in greater detail below with reference to FIG. 7 and FIG. 8.

Method 400 may perform operation 412 during which a wake signal detection model may be generated based, at least in part, on the feature dataset. As similarly discussed above, the machine learning model that is generated and trained during operation 410 may be converted to a low-power machine learning model, and may be transmitted to an audio signal processing device where it is used for audio signal detection. In one example, the low-power machine learning model may be generated by reducing a number of features or dimensions of the machine learning model. For example, a number neurons included in each layer of a neural network may be reduced to generate a simplified machine learning model that incurs a lower processing overhead and results in reduced power consumption.

Figure 5:
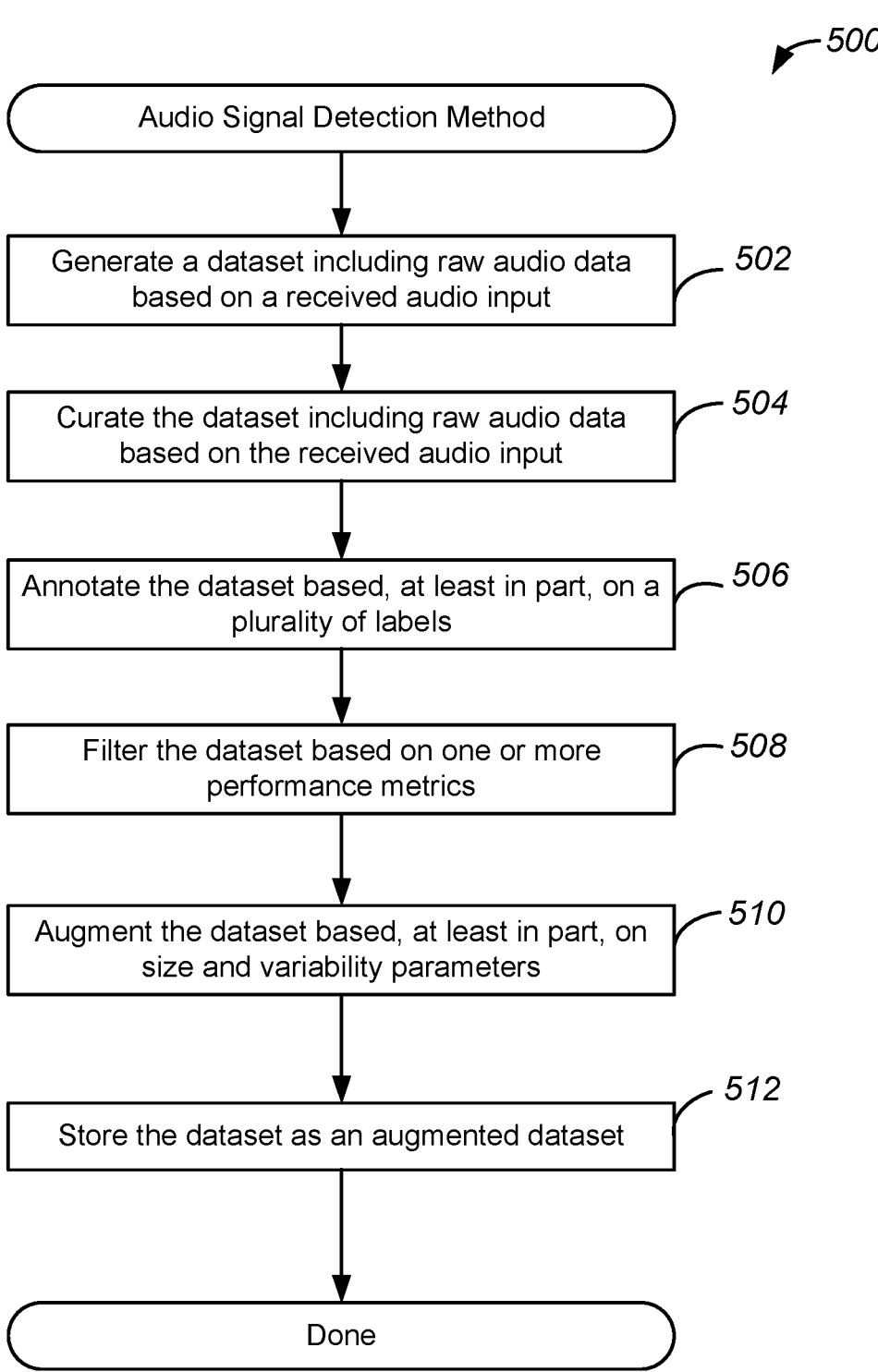
FIG. 5 illustrates an example of an additional method for low-power audio signal detection, performed in accordance with some embodiments.

FIG. 5 illustrates an example of an additional method for low-power audio signal detection, performed in accordance with some embodiments. As discussed above, an audio dataset may be augmented to facilitate improved accuracy of subsequent usage of such a dataset by a machine learning model used for audio signal detection. As will be discussed in greater detail below, a method, such as method 500, may be performed pre-process and augment raw audio data to improve the accuracy and operation of such a machine learning model when performing audio signal detection operations, such as wake word/phrase detection.

Method 500 may perform operation 502 during which a dataset including raw audio data may be generated based on a received audio input. As similarly discussed above, audio data may be stored in a data structure configured to store a waveform or spectrogram generated based on an audio input as well as associated metadata. Such audio data may have been generated based on the audio input as well as audio samples received from various different data sources. Accordingly, during operation 502, a dataset including raw audio data may be generated and/or retrieved from a storage location.

Method 500 may perform operation 504 during which the dataset including raw audio data may be curated based on one or more formatting parameters. In one example, the raw audio data may be stored in a variety of different formats and data structures, and such different formats might not be compatible with one or more formats a machine learning model is capable of ingesting. Accordingly, during operation 504, one or more data transformation operations may be performed to transform a format of a data object included in the dataset to a format compatible with the machine learning model. Such transformation operations may be performed by examining metadata associated with such data objects to identify a format of the data object, and identifying one or more data transformation operations to be applied to the data object based on a designated mapping or look-up-table configured to identify transformation operations for a given data object format. For example, the data objects may be transformed to have audio data stored in a WAV format, and metadata stored in a JSON format. In some embodiments, such transformation operations may be performed by a script included in an application program interface (API) executed by a computing systems, as discussed above.

In some embodiments, the dataset generated during operation 502 may be one of several different types of datasets each identified by a unique identifier, such as a positive dataset (wake word tokens), a negative dataset (garbage speech and/or non-relevant words), a noise dataset (non-speech or music audio input), or one or more variations of these types of datasets. In various embodiments, depending on the input dataset, which may have some directory structure, global metadata file, or some file list, a particular script may be invoked. Accordingly, different scripts and different sets of transformation operations may be implemented for different types of input datasets. In this way, invocation of the API is dataset dependent, and operation of the API is configured based on the types of input datasets. In various embodiments, an output of the API is provided to an output directory regardless of the type of input dataset and script used. For example, all output files may be saved as WAV files sampled at 16 kHz with associated JSON metadata and an output file list which may be a text file.

Method 500 may perform operation 506 during which the dataset may be annotated based, at least in part, on a plurality of labels. More specifically, an automatic speech recognition (ASR) acoustic model may be used to classify phonemes and silence in each data object of the audio data. The ASR model may be any suitable ASR model. In various embodiments, the phonemes output by the ASR model may be used to generate token or acoustic unit annotations (timestamps). More specifically, the ASR model may be configured to identify and classify phonemes included in audio samples of the audio data. Such classifications may identify categories of audio data that may be used to identify whether or not speech is present. For example, such categories may include speech, non-speech, silence, as well as any other suitable category. Thus, in addition to the phoneme tokens themselves, additional annotations are also stored as metadata that is used to classify the phoneme tokens. As will be discussed in greater detail below, such annotations may be used to guide a feature extraction process and reduce a time and processing overhead associated with such feature extraction operations by avoiding unnecessary extraction operations for non-speech data.

Method 500 may perform operation 508 during which the dataset may be filtered based on one or more performance metrics. Accordingly, filtering may be used to identify data objects, such as audio files, that have poor quality and should be excluded from the dataset. In various embodiments, such performance metrics may include metrics such as a signal-to-noise ratio (SNR). More specifically, an A-weighted SNR may be used, and if the A-weighted SNR of an audio file does not meet a designated threshold level, the audio file is removed from the dataset. Other metrics, such as leading and trailing silences may be used. For example, an initial onset of an utterance may be determined using a speech onset detector, as discussed above. If the onset is less than a designated amount of time, the audio file is removed. In another example, an end of an utterance is determined using a voice activity detector. If the end of the utterance is less than a designated amount of time from and end of the audio file, it is removed from dataset. Other metrics, such as peak speech level may also be used. For example, if a peak speech level is greater than a designated threshold value, the audio file is removed. In some embodiments, a minimum utterance length may also be used as determined by using the speech onset detector to identify a beginning of the utterance, using the voice activity detector to identify the end of the utterance, and determining a length of the utterance based on these two times. If the determined length is outside of a designated range, the audio file may be removed.

In various embodiments, additional data processing operations may be globally applied to the dataset. For example, a high-pass filter may be applied to the dataset. Moreover, other operations, such as waveform extension may also be applied. More specifically, a waveform may be extended by adding random Gaussian noise that is scaled and spectrally configured based on a designated speech to noise energy ratio. Such waveform extension may be applied if an audio file is not long enough. In another example, audio files may be removed to achieve a target statistical distribution. For example, a target statistical distribution of different types of audio files may have been determined by an entity, such as a manufacturer or user, and a statistical distribution of the dataset may be compared against the target statistical distribution to determine if one or more audio files should be removed to achieve the target statistical distribution. In this way, various parameters may be specified to identify poor audio files as well as other global changes that should be applied to the dataset, and any data objects included in the dataset having matching parameters may be filtered and removed from the dataset.

Method 500 may perform operation 510 during which the dataset may be augmented based, at least in part, on size and variability parameters. More specifically, the dataset, and waveforms included in the dataset, may be augmented to increase a size and variability of the dataset to reduce the possibility of dataset overfitting. Accordingly such variability may be introduced to increase general applicability of the dataset, and may be introduced via one or more implementations of scaling. In various embodiments, augmentation operations may include waveform scaling, additive noise, room impulse response, time warping (WSOLA), and vocal tract length perturbation (VTLP). In one example, scaling may be applied by normalizing an absolute maximum magnitude of signal, and then applying a scaling constant defined in terms of dB. In another example, scaling may be applied based on energy, and not a maximum magnitude. Accordingly, a variance function may be used to compute an energy after scale normalization.

Method 500 may perform operation 512 during which the dataset may be stored as an augmented dataset. Accordingly, the dataset may be stored in a storage location, such as a system memory, which may be accessible by one or more other system components, as may occur in subsequent operations involving the training and implementation of a machine learning model.

Figure 6:
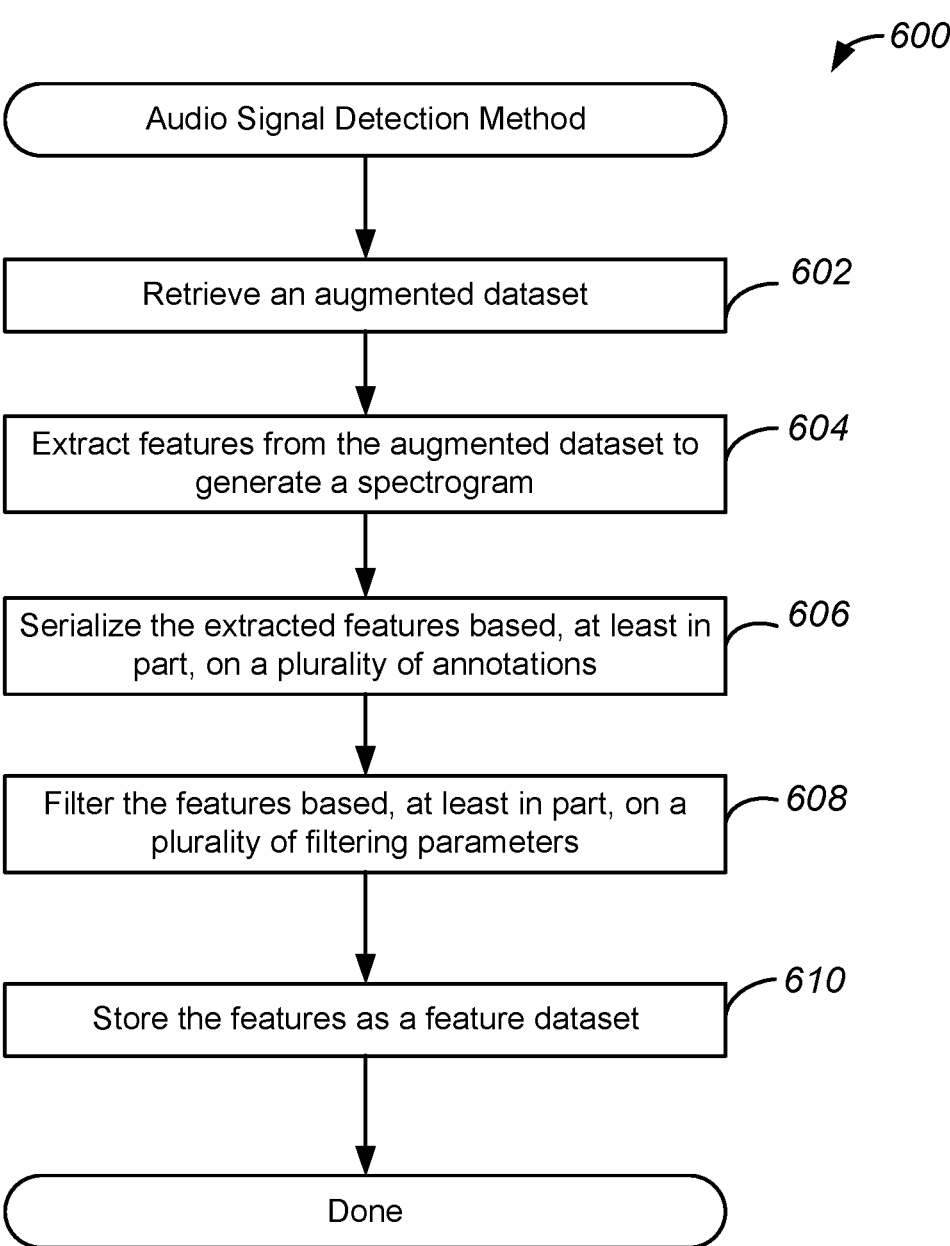
FIG. 6 illustrates an example of another method for low-power audio signal detection, performed in accordance with some embodiments.

FIG. 6 illustrates an example of another method for low-power audio signal detection, performed in accordance with some embodiments. As discussed above, an audio dataset may be augmented to facilitate improved accuracy of subsequent usage of such a dataset by a machine learning model used for audio signal detection. As will be discussed in greater detail below, a method, such as method 600, may be performed to extract features from such an augmented dataset. Such extracted features may be used to generate a feature dataset which may be used to generate a training dataset for a machine learning model used to perform audio signal detection operations, such as wake word/phrase detection.

Method 600 may perform operation 602 during which an augmented dataset may be retrieved. As discussed above, an augmented dataset may be generated based on received audio data. The augmented dataset may have been stored in a storage location, and during operation 602, the dataset may be retrieved from the storage location, or may be received from one or more other system components.

Method 600 may perform operation 604 during which features may be extracted from the augmented dataset to generate a spectrogram. In various embodiments, the features are extracted using a feature extractor that may be implemented in system component, such as a computing system. The feature extractor is configured to extract spectral features from the augmented data based on a designated set of spectral features, as may be defined by a data resource, such as a library of spectral features. The feature extractor may be configured to use such a library to identify such features in the augmented dataset that may include an audio file. Accordingly, an output of the feature extractor may include several spectrograms, such as a log mel spectrogram, a mel-frequency cepstral coefficients (MFCC), and/or any other suitable spectral representations.

Method 600 may perform operation 606 during which the extracted features may be serialized based, at least in part, on a plurality of annotations. As discussed above, the augmented dataset may include annotations that were previously generated. In various embodiments, serialization may be performed to time slice features to ensure the features have consistent dimensions across time. More specifically, the extracted features may be serialized to generate inputs used for a machine learning model, as will be discussed in greater detail below. In various embodiments, the serialization is performed after the feature extraction, thus avoiding the use of padding data values with garbage/filler data values, such as zeros.

In some embodiments, the extracted features are serialized using a moving and overlapping time window. More specifically, the features may be sliced into frames based on a designated time window, and extracted features may be determined for each frame. For example, a 32 ms window may be selected, and MFCCs may be retrieved for that time window, also referred to herein as a frame. The window may then be shifted by, for example, 16 ms, and another frame of extracted features may be obtained. These frames may be stacked to generate a larger window of extracted features that may be used as an input to the machine learning model. This process may be repeated, and the window may again be shifted and stacked to generate another input. The previously described annotations may be used to increase the speed of this application of a sliding overlapping window by performing such serialization based on such annotations. For example, such serialization may be performed when an annotation identifies data as including speech or noise.

Method 600 may perform operation 608 during which the features may be filtered based, at least in part, on a plurality of filtering parameters. In various embodiments, the extracted features may be filtered to obtain a subset of the extracted features based on one or more filtering parameters, such as speech duration as a proportion of total feature duration, one or more metadata characteristics such as gender, augmentation parameters, native speaker, or any other suitable filtering parameter. In various embodiments, feature filtering is performed after feature serialization to increase overall speed of the generation of the feature dataset because additional augmentation and serialization operations are not needed.

Method 600 may perform operation 610 during which the features may be stored as a feature dataset. Accordingly, the dataset may be stored in a storage location, such as a system memory, which may be accessible by one or more other system components, as may occur in subsequent operations involving the training and implementation of a machine learning model.

FIG. 7 illustrates an example of a method for low-power audio signal detection, performed in accordance with some embodiments. As discussed above, a feature dataset may be generated based on features extracted from an audio signal. As will be discussed in greater detail below, a method, such as method 700, may be performed to use the extracted features to configure a machine learning model. More specifically, such extracted features may be used as training data to train a machine learning model to perform audio signal detection operations, such as wake word/phrase detection.

Method 700 may perform operation 702 during which a feature dataset may be retrieved. As similarly discussed above, an augmented dataset may have been based on received audio data and one or more feature extraction operations. The feature dataset may have been stored in a storage location, and during operation 702, the dataset may be retrieved from the storage location, or may be received from one or more other system components.

Method 700 may perform operation 704 during which features of the feature dataset may be concatenated. Thus, according to some embodiments, one or more extracted features may be combined to form a training dataset. More specifically, the extracted features included in the feature dataset may include various different types of features as may be identified by associated identifiers and annotations. Examples of such types of features may be positive features, negative features, and noise features.

During operation 704, the features may be combined to form a training dataset that comports to designated training parameters. Accordingly, features included in the feature dataset may be assigned labels and/or classes, as may be determined based on the identifiers and annotations discussed above. Features may then be combined based on designated weights associated with one or more of the labels and/or classes to obtain a target distribution of such labels and/or classes in the training dataset. In various embodiments, such labels and/or classes may be defined by an entity, such as a user or manufacturer, and such designated weights may also be defined by such an entity. In this way, feature concatenation implements a designated distribution of data augmentation types, as well as other data dimensions and features, such as gender and label. In some examples, threshold numbers of classes may also be defined. For example, a maximum and/or minimum number of samples may be specified per label and/or class. In various embodiments, during operation 704, an output file is generated that includes a single data file and a single metadata file containing all combined features to be used as training data. Additional details are discussed in greater detail below with reference to FIG. 8.

Method 700 may perform operation 706 during which training data may be generated based, at least in part, on the feature dataset. Accordingly, the concatenated features that may be included in an output file may be used to generate a training dataset used to train a machine learning model. In various embodiments, the generation of the training dataset may include converting the output file to a data format compatible with the machine learning model, and capable of being ingested by the machine learning model. In various embodiments, balancing may be performed to ensure the dataset is an ideal candidate for training a model that will generalize well for all tokens.

Method 700 may perform operation 708 during which a machine learning model may be trained using the training data. In various embodiments, the machine learning model is a supervised machine learning model. In one example, the supervised machine learning model is implemented using a neural network and/or other machine learning techniques such as decision trees. As discussed above, the machine learning model may be a prediction model used for word/phrase detection operations. More specifically, a supervised machine learning model may be used to identify extracted patterns in feature data, and to identify words and/or phrases in audio data. Such machine learning models may be generated and implemented using a learning phase and an inference phase. In some embodiments, the machine learning models may be neural networks that include layers of neurons.

Accordingly, during operation 708, the machine learning model, which may be a neural network, may be trained using the training dataset generated during operation 706. In some embodiments, additional training epochs may be implemented based on examples identified by a loss function, and/or using quantization-aware training to further improve accuracy. In this way, one or more additional training techniques may be implemented in additional training phases to further improve the accuracy of the machine learning model.

In various embodiments, a low-power version of the machine learning model may also be generated. The low-power version may be configured to run on a low-power device, such as an audio signal processing device, in real-time. The low-power version may have a lower complexity and may be less computationally intensive than neural networks included in the original machine learning model generated by a computing system. For example, an audio signal processing device may use a first neural network that has fewer neurons and/or features than a second neural network generated by a computing system. In some embodiments, the first neural network may have fewer layers of neurons or connections between neurons than the second neural network. Accordingly, one or more aspects of the neural networks may be configured based on power constraints determined based on the power domain in which the neural network is implemented. In some embodiments, the model is trained in a manner that encourages sparsity and into values weights to facilitate the conversion to a quantized representation for use on a low-power device, which may be an embedded device.

Method 700 may perform operation 710 during which the machine learning model may be tested using test data and test parameters. In various embodiments, the test data and test parameters include sample audio files as well as associated parameters that may be varied. For example, the test parameters may include varying levels of noise and room impulse response measured at different distances. The test data may include various different types of audio files, such as real-world, enhanced, and synthetic data. The machine learning model may be tested at various operating points. Since the correct result is known, as defined in the test data, the output of the machine learning model may be stored and compared against the ground truth provided by test data. The result may also be provided to an entity, such as a user or manufacturer, that may also configure the testing of the machine learning model.

Method 700 may perform operation 712 during which the machine learning model may be updated based on a result of the test. Accordingly, one or more updates and/or modifications may be identified based on a result of the testing. Such modifications may include adjustment to one or more weights of the machine learning model and the training dataset used for the machine learning model. Thus, iterative test operations may be used to try different modifications to weights and to determine a configuration of the machine learning model that has a high accuracy based on the results of the testing and modifications of. In this way, testing may be used to implement an iterative feedback loop that improves the accuracy of the machine learning model that is ultimately sent to and implemented in the audio signal processing device.

Figure 8:
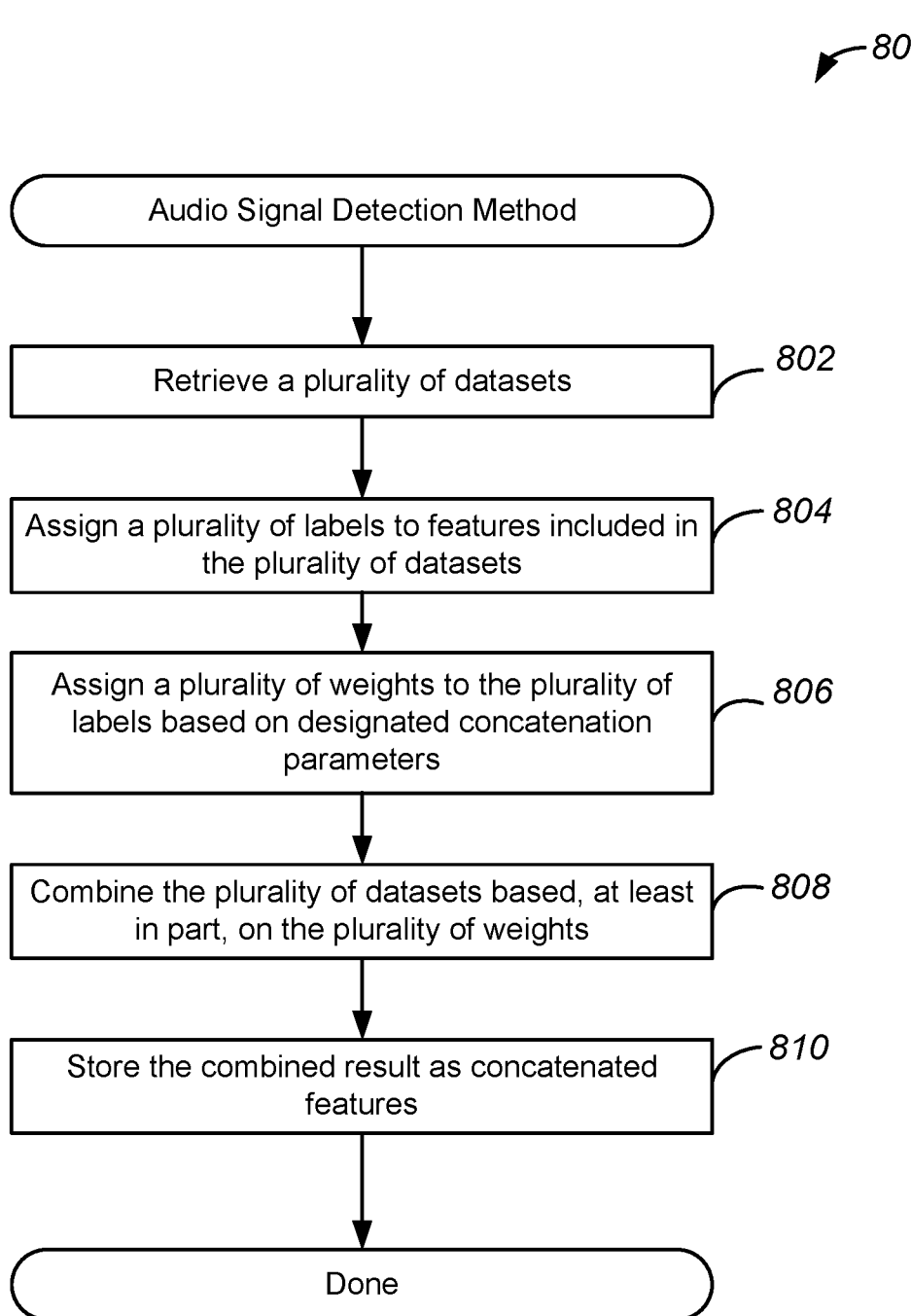
FIG. 8 illustrates an example of an additional method for low-power audio signal detection, performed in accordance with some embodiments.

FIG. 8 illustrates an example of an additional method for low-power audio signal detection, performed in accordance with some embodiments. As discussed above, a feature dataset may be generated based on features extracted from an audio signal. As will be discussed in greater detail below, a method, such as method 800, may be performed to concatenate extracted features into such a feature dataset.

Method 800 may perform operation 802 during which a plurality of datasets may be retrieved. As similarly discussed above, datasets may have been generated by extracting features from audio data. Moreover, the extracted features may be stored as data objects having associated metadata. In various embodiments, multiple datasets may be retrieved from different audio files and different extraction operations. Accordingly, multiple different datasets may be retrieved during operation 802. Such datasets may be retrieved from a storage location, or may be received from one or more other system components.

Method 800 may perform operation 804 during which a plurality of labels may be assigned to features included in the plurality of datasets. As discussed above, features may have been previously augmented and annotated. During operation 804, additional labels and/or classes may also be assigned and stored in metadata. In various embodiments, such labels and/or classes may be defined by an entity, such as a user or manufacturer, and may be used to specify configuration parameters used to configure the generation of training data, as similarly discussed above. More specifically, labels may correspond to different dataset dimensions that may have associated weights determining their representation in the training dataset. Accordingly, such labels may be assigned by a system component by mapping identifiers and annotations to labels based on a designated mapping that may have been defined by an entity, such as a user, and during operation 804, metadata may be updated to further include the assigned labels.

Method 800 may perform operation 806 during which a plurality of weights may be assigned to the plurality of labels based on designated concatenation parameters. Accordingly, a weight may be determined for each of the labels to implement a statistical distribution of features based on the weights. As similarly discussed above, the weights may be determined by an entity, such as a user, and may have been previously defined and stored by the entity. In various embodiments, the weights may also include one or more threshold values. For example, such threshold values may define maximum and/or minimum numbers of samples for a particular label. For example, a maximum and/or minimum number of samples may be specified per label and/or class. In this way, statistical distributions of labels and/or classes may also be bounded.

Method 800 may perform operation 808 during which the plurality of datasets may be combined based, at least in part, on the plurality of weights. Accordingly, the datasets and features included in the datasets may be combined into a single data structure. In this way, multiple datasets may be combined into a single output file that includes a single data file and a single metadata file. Moreover, the distribution of features included in the output file has a statistical distribution determined based on the plurality of weights.

Method 800 may perform operation 810 during which the combined result is stored as concatenated features. Accordingly, the feature dataset may be updated to include the concatenated features, and an output file of the concatenation process may be stored in a storage location, such as a system memory, which may be accessible by one or more other system components, as may occur in subsequent operations involving the training and implementation of a machine learning model.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

receiving a dataset including raw audio data, the raw audio data comprising a plurality of audio samples and associated metadata;

generating, using one or more processing elements, an augmented dataset based on the raw audio data, the augmented dataset comprising a plurality of annotations identifying types of raw audio data, the plurality of annotations being generated based, at least in part, on the metadata associated with the plurality of audio samples;

generating, using the one or more processing elements, a feature dataset by extracting features from the augmented dataset based, at least in part, on the plurality of annotations and using the plurality of annotations to serialize the extracted features to generate an input for a wake signal detection model; and generating, using the one or more processing elements, the wake signal detection model based, at least in part, on the feature dataset, the wake signal detection model being a machine learning model trained based on the feature dataset, the generating of the wake signal detection model further comprising reducing a number of dimensions of the machine learning model based, at least in part, on power consumption characteristics of a target audio signal processing device.

2. The method of claim 1 further comprising:

generating, using the one or more processing elements, training data based, at least in part, on the feature dataset.

3. The method of claim 2, wherein the generating of the training data further comprises:

concatenating at least some of the extracted features included in the feature dataset; and generating an output file based on the concatenation of the at least some of the extracted features.

4. The method of claim 1, wherein the generating of the augmented dataset further comprises:

classifying a plurality of phonemes included in the raw audio data;

generating a plurality of tokens based on the plurality of phonemes; and generating the plurality of annotations based on the plurality of tokens.

5. The method of claim 4, wherein the classifying is performed by an automatic speech recognition model, and wherein the plurality of tokens identify whether or not speech is present in each of the plurality of phonemes.

6. The method of claim 1 further comprising:

testing the wake signal detection model using test data.

7. The method of claim 6 further comprising:

modifying one or more weights associated with the wake signal detection model based on a result of the testing.

8. The method of claim 1 further comprising:

generating a low-power model based on the wake signal detection model, the low-power model having the reduced number of dimensions.

9. The method of claim 8, wherein the low-power model is configured to execute on a low-power device in real-time.

10. A system comprising:

a communications interface configured to receive raw audio data, the raw audio data comprising a plurality of audio samples and associated metadata;

one or more processing elements configured to:

generate a dataset based on the raw audio data received from the communications interface;

generate an augmented dataset based on the raw audio data, the augmented dataset comprising a plurality of annotations identifying types of raw audio data, the plurality of annotations being generated based, at least in part, on the metadata associated with the plurality of audio samples;

generate a feature dataset by extracting features from the augmented dataset based, at least in part, on the plurality of annotations and using the plurality of annotations to serialize the extracted features to generate an input for a wake signal detection model; and generate the wake signal detection model based, at least in part, on the feature dataset, the wake signal detection model being a machine learning model trained based on the feature dataset, the generating of the wake signal detection model further comprising reducing a number of dimensions of the machine learning model based, at least in part, on power consumption characteristics of a target audio signal processing device.

11. The system of claim 10, wherein the one or more processing elements are further configured to:

generate training data based, at least in part, on the feature dataset.

12. The system of claim 11, wherein the one or more processing elements are further configured to:

concatenate at least some of the extracted features included in the feature dataset; and generate an output file based on the concatenation of the at least some of the extracted features.

13. The system of claim 10, wherein the one or more processing elements are further configured to:

classify a plurality of phonemes included in the raw audio data, wherein the classifying is performed by an automatic speech recognition model;

generate a plurality of tokens based on the plurality of phonemes, wherein the plurality of tokens identify whether or not speech is present in each of the plurality of phonemes; and generate the plurality of annotations based on the plurality of tokens.

14. The system of claim 10, wherein the one or more processing elements are further configured to:

generate a low-power model based on the wake signal detection model, the low-power model having the reduced number of dimensions.

15. The system of claim 14, wherein the low-power model is configured to execute on a low-power device in real-time.

16. A device comprising:

one or more processing elements configured to:

receive a dataset including raw audio data, the raw audio data comprising a plurality of audio samples and associated metadata;

generate an augmented dataset based on the raw audio data, the augmented dataset comprising a plurality of annotations identifying types of raw audio data, the plurality of annotations being generated based, at least in part, on the metadata associated with the plurality of audio samples;

generate a feature dataset by extracting features from the augmented dataset based, at least in part, on the plurality of annotations and using the plurality of annotations to serialize the extracted features to generate an input for a wake signal detection model; and generate the wake signal detection model based, at least in part, on the feature dataset, the wake signal detection model being a machine learning model trained based on the feature dataset, the generating of the wake signal detection model further comprising reducing a number of dimensions of the machine learning model based, at least in part, on power consumption characteristics of a target audio signal processing device.

17. The device of claim 16, wherein the one or more processing elements are further configured to:

generate training data based, at least in part, on the feature dataset.

18. The device of claim 17, wherein the one or more processing elements are further configured to:

concatenate at least some of the extracted features included in the feature dataset; and generate an output file based on the concatenation of the at least some of the extracted features.

19. The device of claim 16, wherein the one or more processing elements are further configured to:

classify a plurality of phonemes included in the raw audio data, wherein the classifying is performed by an automatic speech recognition model;

generate a plurality of tokens based on the plurality of phonemes, wherein the plurality of tokens identify whether or not speech is present in each of the plurality of phonemes; and generate the plurality of annotations based on the plurality of tokens.

20. The device of claim 16, wherein the one or more processing elements are further configured to:

generate a low-power model based on the wake signal detection model, wherein the low-power model has the reduced number of dimensions, and wherein the low-power model is configured to execute on a low-power device in real-time.

* * * * *